(12) United States Patent
Negishi

(10) Patent No.: US 7,669,062 B2
(45) Date of Patent: Feb. 23, 2010

(54) IMAGE PROCESSING APPARATUS WITH DISTRIBUTED PROCESSING AND SHUTDOWN CONTROL METHOD

(75) Inventor: Akira Negishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 11/277,576

(22) Filed: Mar. 27, 2006

(65) Prior Publication Data

US 2006/0224660 A1 Oct. 5, 2006

(30) Foreign Application Priority Data

Apr. 1, 2005 (JP) ............................. 2005-106790

(51) Int. Cl.
*G06F 1/00* (2006.01)
*G06F 1/26* (2006.01)
*G06F 15/16* (2006.01)

(52) U.S. Cl. ..................... 713/300; 713/310; 709/201
(58) Field of Classification Search ................. 713/300, 713/310; 709/201
See application file for complete search history.

(56) References Cited

U.S. PATENT DOCUMENTS

| 4,731,750 A | | 3/1988 | Hoflich et al. ............... 364/900 |
| 5,918,059 A | * | 6/1999 | Tavallaei et al. ............ 713/300 |
| 6,115,824 A | * | 9/2000 | Ha ............................... 713/330 |
| 6,412,074 B1 | * | 6/2002 | Flannery ..................... 713/310 |
| 2002/0131069 A1 | | 9/2002 | Wanda ........................ 358/1.14 |
| 2003/0206313 A1 | | 11/2003 | Ferlitsch ..................... 358/1.15 |
| 2006/0007469 A1 | * | 1/2006 | Uruma ........................ 358/1.14 |
| 2006/0028661 A1 | * | 2/2006 | Uruma ......................... 358/1.6 |

FOREIGN PATENT DOCUMENTS

| EP | 0 468 762 A | 1/1992 |
| EP | 0 478 355 A | 4/1992 |
| EP | 0 566 386 A | 10/1993 |
| EP | 1 096 364 A | 5/2001 |
| EP | 1 349 372 A | 10/2003 |

\* cited by examiner

*Primary Examiner*—Ji H Bae
(74) *Attorney, Agent, or Firm*—Fitzpatrick, Cella, Harper & Scinto

(57) ABSTRACT

It is an object of this invention to, in an image processing apparatus executing load distribution processing over a network, perform appropriate processing in accordance with an instruction from a user at power shutdown. There is provided an image processing apparatus which is connected to a network and performs processing requested by another apparatus over the network, including a notifying unit which, if the apparatus is instructed to shut down power during execution of the requested processing, provides notification to a user that the requested processing is being performed, an input unit for a user to input an instruction in response to the notification, and a termination processing unit which shuts down power after performing processing corresponding to the instruction.

13 Claims, 16 Drawing Sheets

FIG. 7

SETTING FOR APPLICATION OF
DISTRIBUTION PROCESSING

| HOST NAME | GRID |
|---|---|
| PC1 | USE |
| PC2 | NOT USE |
| PC4 | USE |
| ..... | |
| ..... | |
| PC100 | USE |
| ..... | |

SET

POWER-OFF

SHUTDOWN IS IN PROGRESS...

US 7,669,062 B2

IMAGE PROCESSING APPARATUS WITH DISTRIBUTED PROCESSING AND SHUTDOWN CONTROL METHOD

FIELD OF THE INVENTION

The present invention relates to an image processing apparatus and a control method for the image processing apparatus and, more particularly, to processing at power shutdown in an image processing apparatus connected to a network and configured to be capable of executing processing requested by another apparatus over the network.

BACKGROUND OF THE INVENTION

In recent years, grid computing (to be also simply referred to as "grid" hereinafter), which utilizes a plurality of available computers connected over a network as one system, is attracting attention. Attempts are being made to apply grid computing to various fields.

FIG. 1 is a diagram for explaining the architecture of grid computing. There are several types of grid computing. Grid computing to be explained here is of a type called desktop grid computing which performs a job using the idle time of the CPU of a desktop PC or the like.

In FIG. 1, a client 10 is a device to which a user submits a job as a request. A submitted job is passed to a task manager (to be abbreviated as TM hereinafter) 20. The TM 20 transmits the description of the job to a dynamic job scheduler (to be abbreviated as DJS hereinafter) 30.

The DJS 30 manages all of the resources of a plurality of host devices 41 to 43, each of which includes a broker 411 and a resource manager (to be abbreviated as RM hereinafter) 412 and is recognized as a resource. The DJS 30 analyzes a job, selects the brokers 411 of the most favorable ones of the resources, and notifies the TM 20 of the selected brokers 411. Note that a resource refers to a CPU which is in an idle state and available.

Each broker 411 registers in advance resource information acquired by the corresponding RM 412 in the DJS 30. Each selected broker 411 submits the job to the corresponding most favorable resource at the request of the TM 20. The broker 411 notifies the TM 20 of the completion of the job upon termination of the job.

The TM 20 submits a job to the most favorable ones of the brokers 411 selected by the DJS 30 and monitors the progress of the job thereafter. Upon receipt of a completion notification from each selected broker 411, the TM 20 notifies the client 10 of the result. If a change or abnormality (e.g., a failure, receipt of another job, or the like) occurs in the corresponding resource, the RM 412 notifies the broker 411 to that effect.

With this mechanism, a job is distributed among resources such as CPUs which are generally unused, thereby allowing distribution processing by a plurality of devices without making a user conscious of the distribution processing. This implements desktop grid computing.

Research has been made to join the CPU power of computers using grid computing technology as described above and implement high-speed processing. However, the technology is not often applied to a computer peripheral.

The configuration of a case where the computing technology is applied to PDL processing of an image processing apparatus will be explained with reference to FIG. 2. In the explanation with reference to FIG. 1, modules with which grid computing is implemented are treated as separate ones. If the technology is applied to a printing apparatus, a plurality of modules are generally present in one device.

FIG. 2 is a diagram showing the configuration of a case where grid computing is applied to PDL processing (a process of converting page description language codes into a raster image) of a printer. In the example shown in FIG. 1, the modules with which grid computing is implemented are treated as separate units. However, if grid computing is applied to an image forming apparatus such as a multifunction peripheral equipment (MFP) or printer, a plurality of modules are generally present in one device.

In the configuration in FIG. 2, a user submits a job such as a printing instruction from a client PC 110. The submitted job is analyzed by an image forming apparatus 120 such as a printer having a TM function and a DJS function, and distribution processing by grid computing is performed using the resources of three PCs PC1 141, PC2 142, and PC3 143 each having a broker and an RM.

More specifically, in the configuration shown in FIG. 2, the image forming apparatus 120 also has a function as a host in grid computing. A PC other than the image forming apparatus 120, of course, may have a function as a host.

When a PDL print job is submitted from the client PC 110, the job is appropriately distributed among the resources of the PCs 141 to 143 via the TM and DJS of the image forming apparatus 120. Simultaneously with this, an application program for converting PDL codes into an image is also transmitted from the image forming apparatus 120 to each PC.

Images formed by converting the PDL codes in the respective PCs are collected and finally output in a combined state by the image forming apparatus 120.

The number of clients (resources) to which the distribution processing is to be allocated is not particularly limited, and three or more clients may be used. The distribution processing may be allocated to the resource of the client PC 110, to which a job is submitted, or the resource of the image forming apparatus 120.

As applications of grid computing to an MFP, there can be considered distribution of processing which requires high CPU power such as OCR or automatic search key generation, in addition to PDL processing as explained above with reference to FIG. 2.

However, an MFP often shuts down power at a closing time, upon the occurrence of trouble, or the like. In the configuration of general grid computing as explained above, distribution processing being performed as background processing is not taken into consideration at power shutdown. Accordingly, if the power of an apparatus with which grid computing is implemented is unexpectedly shut down, distribution processing requested by another device and being performed as background processing is stopped and left incomplete. For this reason, the efficiency in distribution processing decreases.

In an OS such as Microsoft Windows (registered trademark), it is possible to lay open a folder on the hard disk of a PC as a shared folder on a network. To shut down a PC while the shared file is being accessed by another PC, a process of inquiring of a user whether to disconnect the other PC is performed. However, this is processing related to a shared folder and not related to distribution processing requested by another device and being performed in the background.

There is a need for a technique which makes it possible to designate which processing is to be performed at power shutdown when load distribution processing such as grid computing is applied to a plurality of computer peripherals connected over a network, and the power of each apparatus constituting a system is to be shut down, as described above.

SUMMARY OF THE INVENTION

The present invention has been made in consideration of the above-described circumstances, and has as its object to allow an image processing apparatus executing load distribution processing over a network to perform appropriate processing in accordance with an instruction from a user at power shutdown.

It is another object of the present invention to distribute processing among appropriate apparatuses according to a condition desired by a user when performing load distribution processing using grid computing technology or the like.

An image processing apparatus as an aspect of the present invention which achieves the object is an image processing apparatus connected to a network and configured to be capable of executing processing requested by another apparatus over the network, comprising notifying means for, if the apparatus is instructed to shut down power during execution of the requested processing, providing notification to a user that the requested processing is being performed, input means for the user to input an instruction in response to the notification, and termination processing means for shutting down power after performing predetermined processing corresponding to the instruction.

A control method for an image processing apparatus as another aspect of the present invention which achieves the object is a control method for an image processing apparatus connected to a network and configured to be capable of executing processing requested by another apparatus over the network, comprising a determination step of, if the apparatus is instructed to shut down power, determining whether the request processing is being performed, a notifying step of, if it is determined that the requested processing is being performed, providing notification accordingly to a user, an instruction receiving step of receiving an instruction input by the user in response to the notification, and a termination processing step of shutting down power after performing predetermined processing corresponding to the instruction.

More specifically, according to the present invention, an image processing apparatus connected to a network and configured to be capable of executing processing requested by another apparatus over the network determines whether the requested processing is being performed when the apparatus is instructed to shut down power. If the requested processing is being performed, the apparatus provides notification accordingly to a user and shuts down power after performing predetermined processing corresponding to an instruction input by the user in response to the notification.

In this case, a configuration in which load distribution processing by a plurality of apparatuses such as grid computing is applied to an image processing apparatus provides notification to a user that processing requested by another apparatus is being performed if the image processing apparatus is executing the requested processing and performs predetermined termination processing such that the processing corresponds to an instruction from the user in response to the notification.

Consequently, an image processing apparatus executing load distribution processing over a network performs appropriate processing in accordance with an instruction from a user at power shutdown. This makes it possible to suppress a decrease in processing efficiency caused by distribution processing and prevent the load distribution processing from being left incomplete.

An image processing apparatus as an aspect of the present invention which achieves the other object is an image processing apparatus connected to a network and configured to be capable of requesting processing of a plurality of other apparatuses over the network, comprising grouping means for dividing the plurality of other apparatuses into a plurality of groups according to a predetermined criterion, input means for a user to input a condition for processing to be requested, and group selecting means for selecting a group of which the processing is requested on the basis of the condition.

With this configuration, it is possible to distribute load distribution processing to an appropriate group according to a condition desired by a user when performing the load distribution processing using grid computing technology or the like.

The objects are also achieved by a computer program for causing an information processing apparatus to perform the control method for an image processing apparatus and a storage medium storing the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view showing an example of the user interface screen related to the processing in FIG. 5;

FIG. 14 is a view showing an example of a screen to be displayed during power-off processing of the first embodiment;

DETAILED DESCRIPTION OF THE PREFERRED EMBODIMENTS

Preferred embodiments of the present invention will be illustrated in detail below with reference to the accompanying drawings. Note that components described in the following embodiments are illustrative only and not intended to limit the scope of the present invention to the embodiments.

First Embodiment (Hard Configuration of Image Forming Apparatus)

Figure 3:
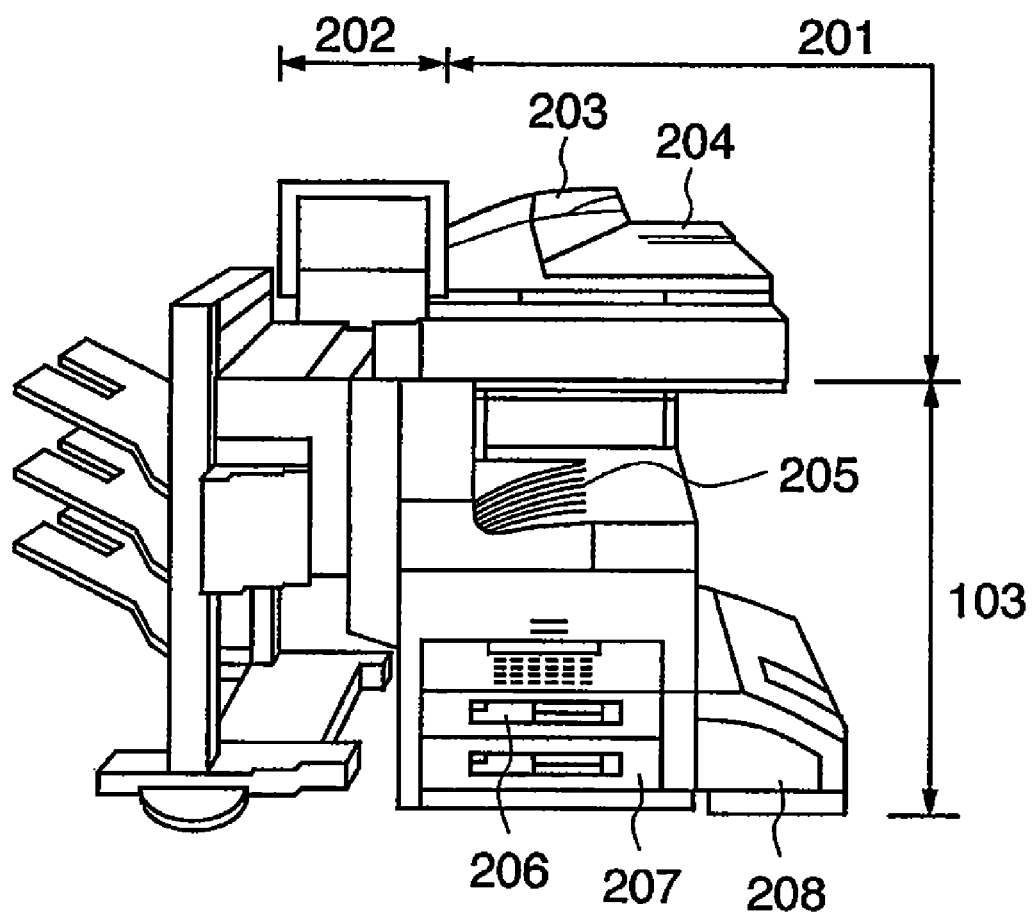
FIG. 3 is a view showing the outer appearance of an image forming apparatus according to the present invention.

FIG. 3 is a view showing the outer appearance of an example of an image forming apparatus as an embodiment of an image processing apparatus with which grid computing (to be also simply referred to as "grid" hereinafter) is implemented according to the present invention. The image forming apparatus of this embodiment is a multifunction peripheral equipment (MFP) having a scanner function, copying function, and printing function.

A scanner 201 serving as an image input device illuminates an image on a paper sheet serving as a document and scans the document with a CCD line sensor (not shown), thereby generating raster image data.

When a user sets document paper sheets in a tray 203 of a document feeder 204 and gives an instruction to start read operation with an operating section 202, a controller CPU of the image forming apparatus gives the instruction to the scanner 201. Upon receipt of the instruction, the feeder 204 feeds the document paper sheets one by one, and the scanner 201 performs the operation of reading document images.

The operating section 202 is a user interface for designating settings or displaying the status at the time of copying operation or designating settings for various operations. The operating section 202 includes a touch panel type operation panel.

A printer engine 103 serving as an image output device prints raster image data on a print paper sheet. Methods for the printing include an electrophotographic method using a photosensitive drum or photosensitive belt, an ink jet method of discharging ink from an array of minute nozzles and directly printing an image on a paper sheet, and the like. Any method may be used. Note that print operation is started in accordance with an instruction from the controller CPU.

The printer engine 103 has a plurality of paper feed stages to allow selection among different print paper sizes or different print paper orientations. The printer engine 103 includes paper cassettes 206, 207, and 208 corresponding to the paper feed stages. A discharge tray 205 receives a printed paper sheet.

Figure 4:
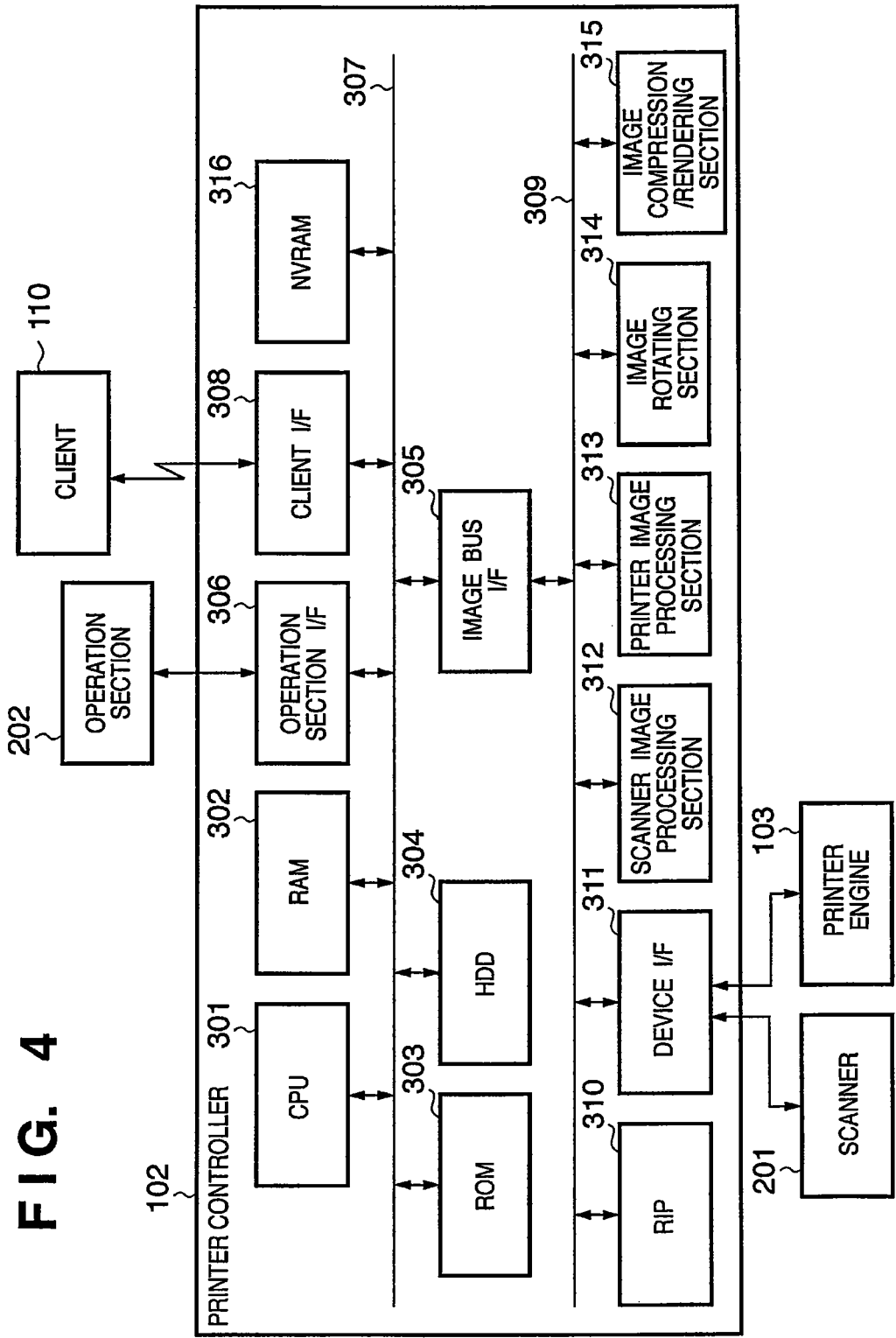
FIG. 4 is a block diagram showing the control configuration of the image forming apparatus in FIG. 3.

FIG. 4 is a block diagram showing the control configuration of the image forming apparatus of this embodiment. A printer controller 102 is connected to the scanner 201 serving as the image input device and the printer engine 103 serving as the image output device. The printer controller 102 exchanges print data, image information, and device information with a client 110 via a client I/F 308.

A CPU 301 is a controller which controls the entire system. A RAM 302 is a system work memory used by the CPU 301 to operate. The RAM 302 also serves as an image memory for temporarily storing image data. A ROM 303 is a boot ROM and stores a boot program for the system. A HDD 304 is a hard disk drive and stores system software and image data.

An operating section I/F 306 controls an interface with the operating section (UI) 202 and outputs, to the operating section 202, image data to be displayed on the operating section 202. The operating section I/F 306 also serves the function of transmitting information input by a user through the operating section 202 to the CPU 301. Configuration information such as an operation mode input from the operating section 202 is stored in an NVRAM 316 which is a nonvolatile memory.

The client I/F 308 inputs or outputs information from or to each client 110. The above-described devices are arranged on a system bus 307.

An image bus interface (image bus I/F) 305 is a bus bridge which connects the system bus 307 and an image bus 309 which transfers image data at high speed and converts the structure of data.

The following devices are arranged on the image bus 309. A raster image processor (RIP) 310 converts PDL codes sent from a network into a bitmap image. A device I/F section 311 connects the printer controller 102 to the scanner 201 serving as the image input device or the printer engine 103 serving as the image output device and performs synchronous/asynchronous conversion for image data.

A scanner image processing section 312 corrects, processes, and edits input image data. A printer image processing section 313 performs printer correction, resolution conversion, and the like for image data to be printed out. An image rotating section 314 rotates image data. An image compression/rendering section 315 performs compression/rendering processing for multilevel image data using JPEG and performs compression/rendering processing for binary image data using JBIG, MMR, MH, or the like.

The image forming apparatus of this embodiment with this configuration is connected to each client (PC) through the client interface (e.g., a network interface capable of intercommunication such as Ethernet (registered trademark)) 308. The image forming apparatus also operates as a host which performs load distribution processing by grid computing.

(Setup in Image Forming Apparatus)

Figure 1:
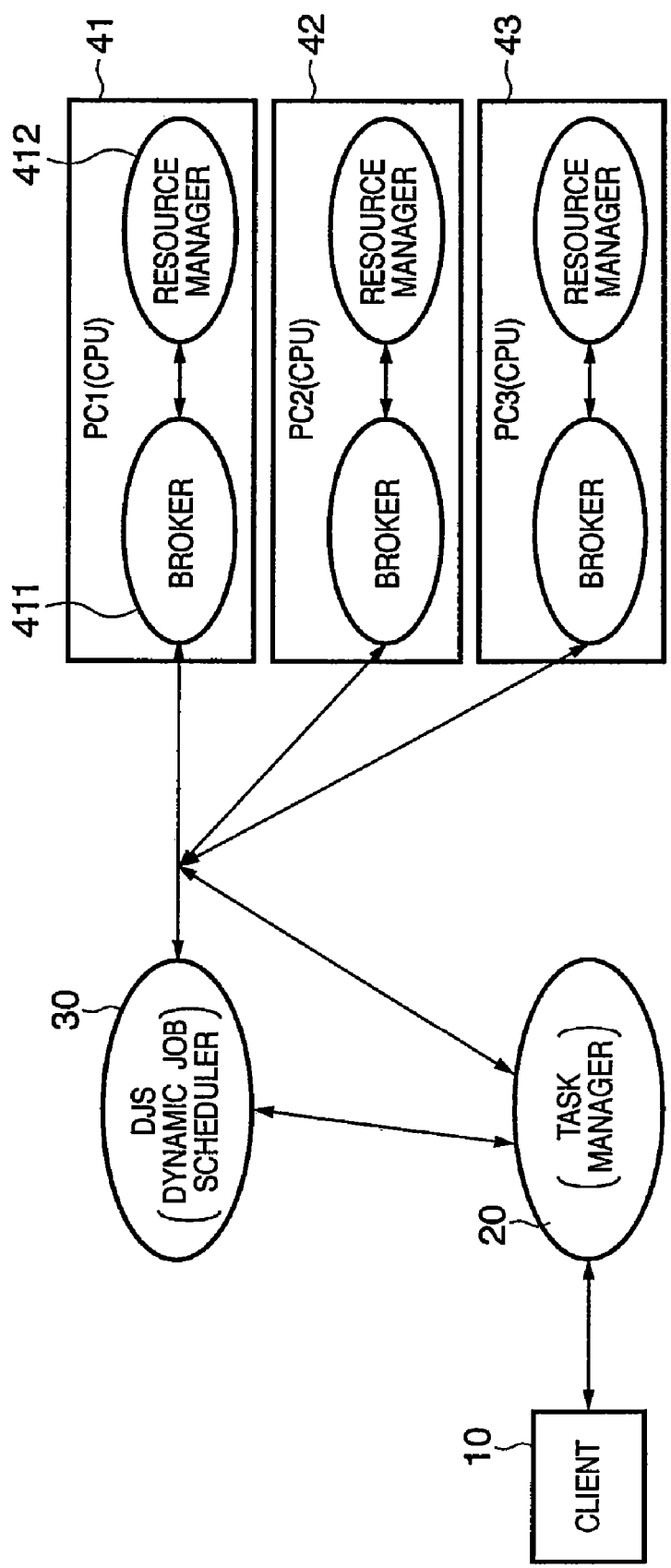
FIG. 1 is a diagram showing the basic configuration of grid computing.
Figure 2:
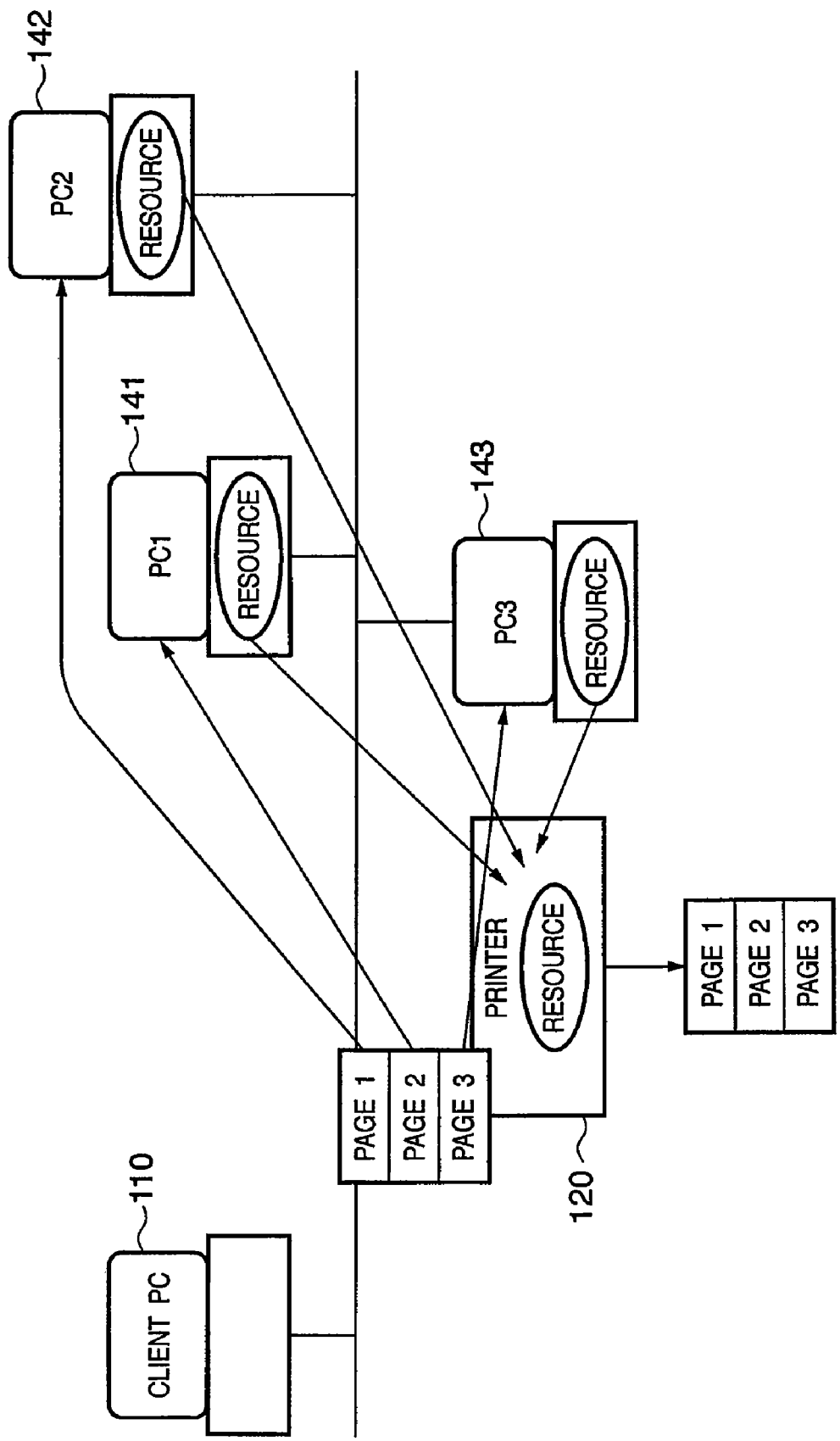
FIG. 2 is a diagram showing an example of a case where grid computing is applied to PDL processing of a printer.

Setup performed when grid computing is applied to the above-described image forming apparatus in this embodiment will be explained below. Note that the technology and configuration of grid computing used in this embodiment are the same as those explained with reference to FIGS. 1 and 2.

In the following description, a case will be explained where a device to participate in grid computing is set up from the image forming apparatus of this embodiment. However, it is also possible to set up a grid computing-based device from another device or apparatus within the same network. The image forming apparatus of this embodiment is capable of operating as a client and operating as a host in a grid system at the same time.

If apparatuses with which grid computing is implemented are configured to be operable both as a client and a host, each apparatus can simultaneously perform a plurality of types of processing requested by a plurality of other apparatuses.

Figure 5:
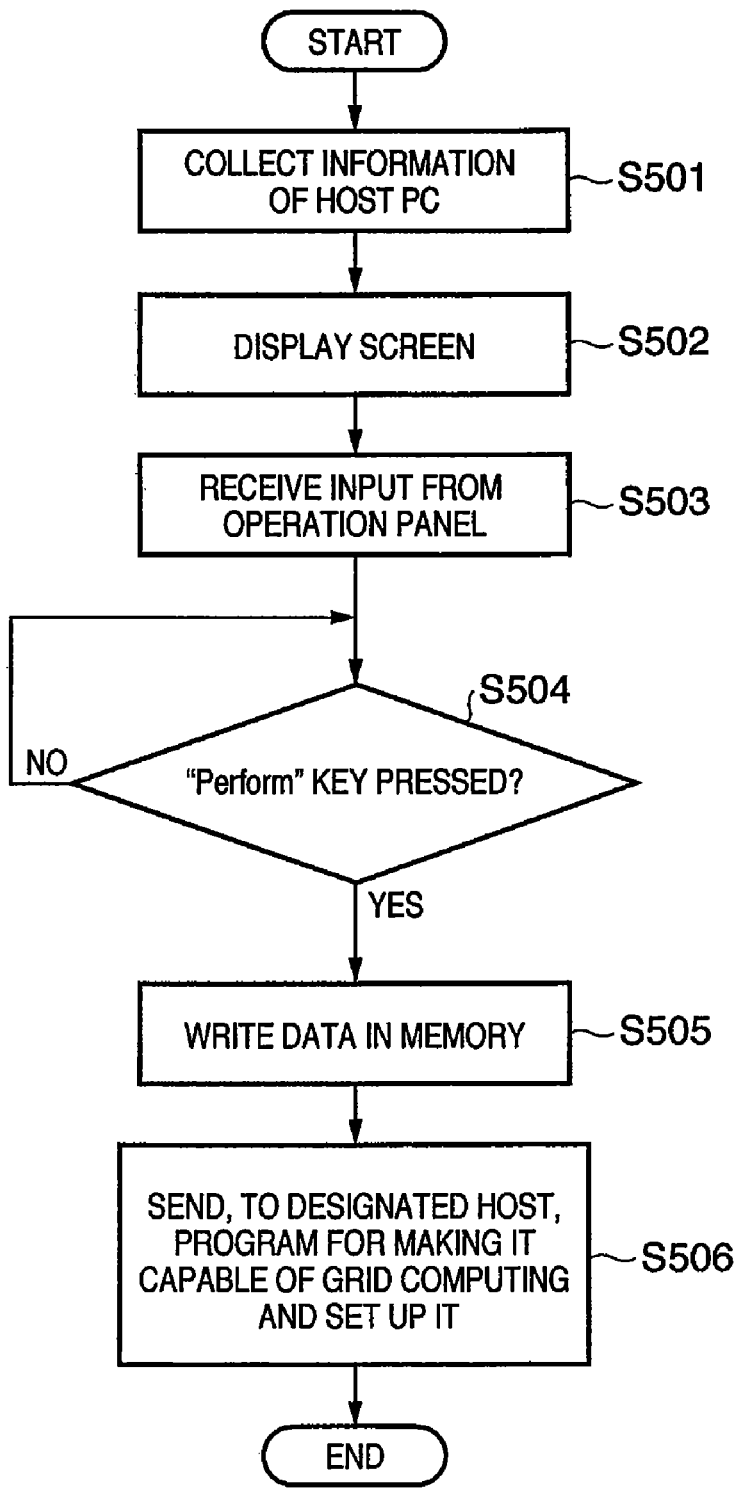
FIG. 5 is a flowchart showing processing at the time of setup in the image forming apparatus of a first embodiment.
Figure 6:
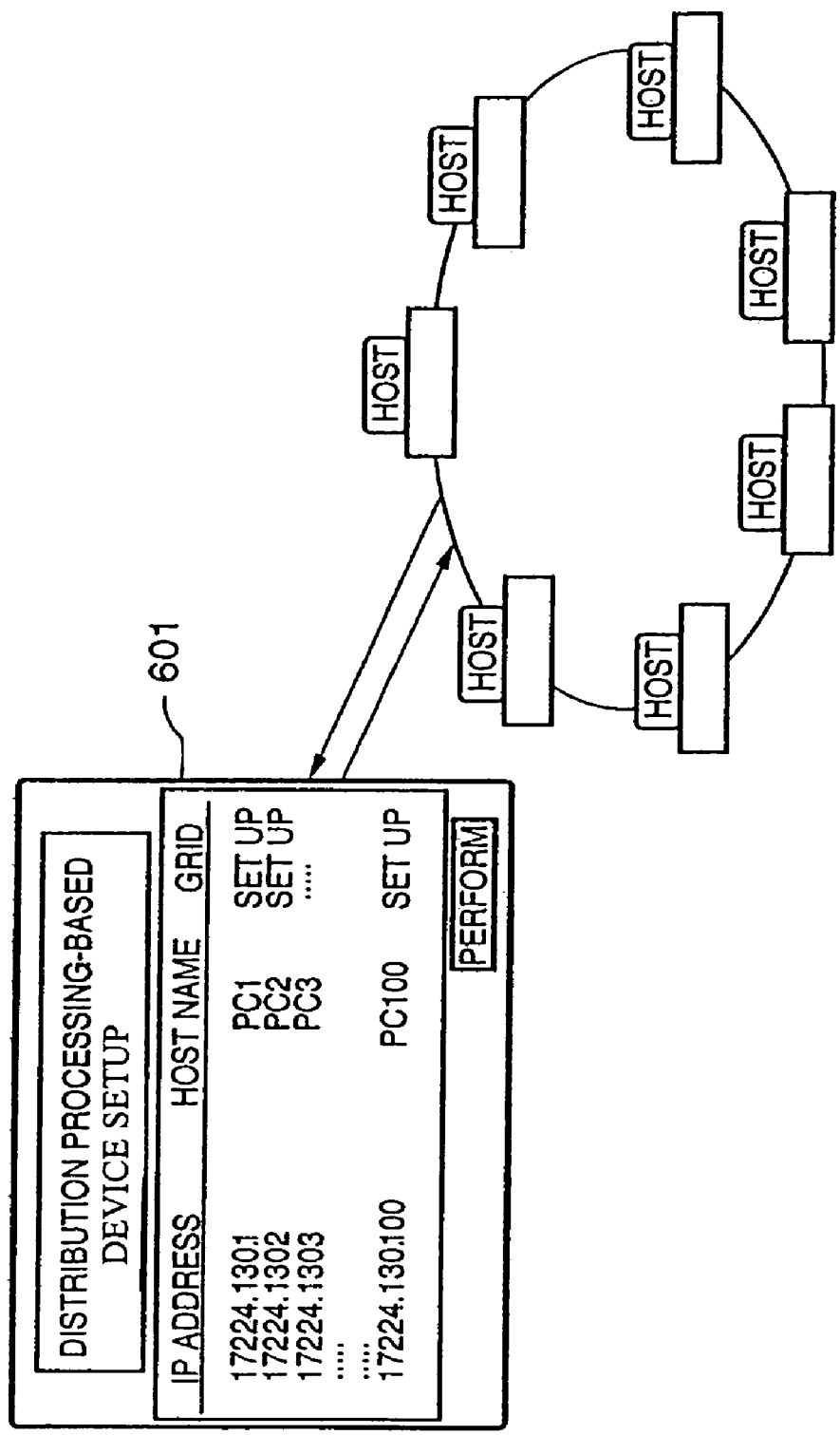
FIG. 6 is a view showing an example of a user interface screen related to the processing in FIG. 5.
Figure 8:
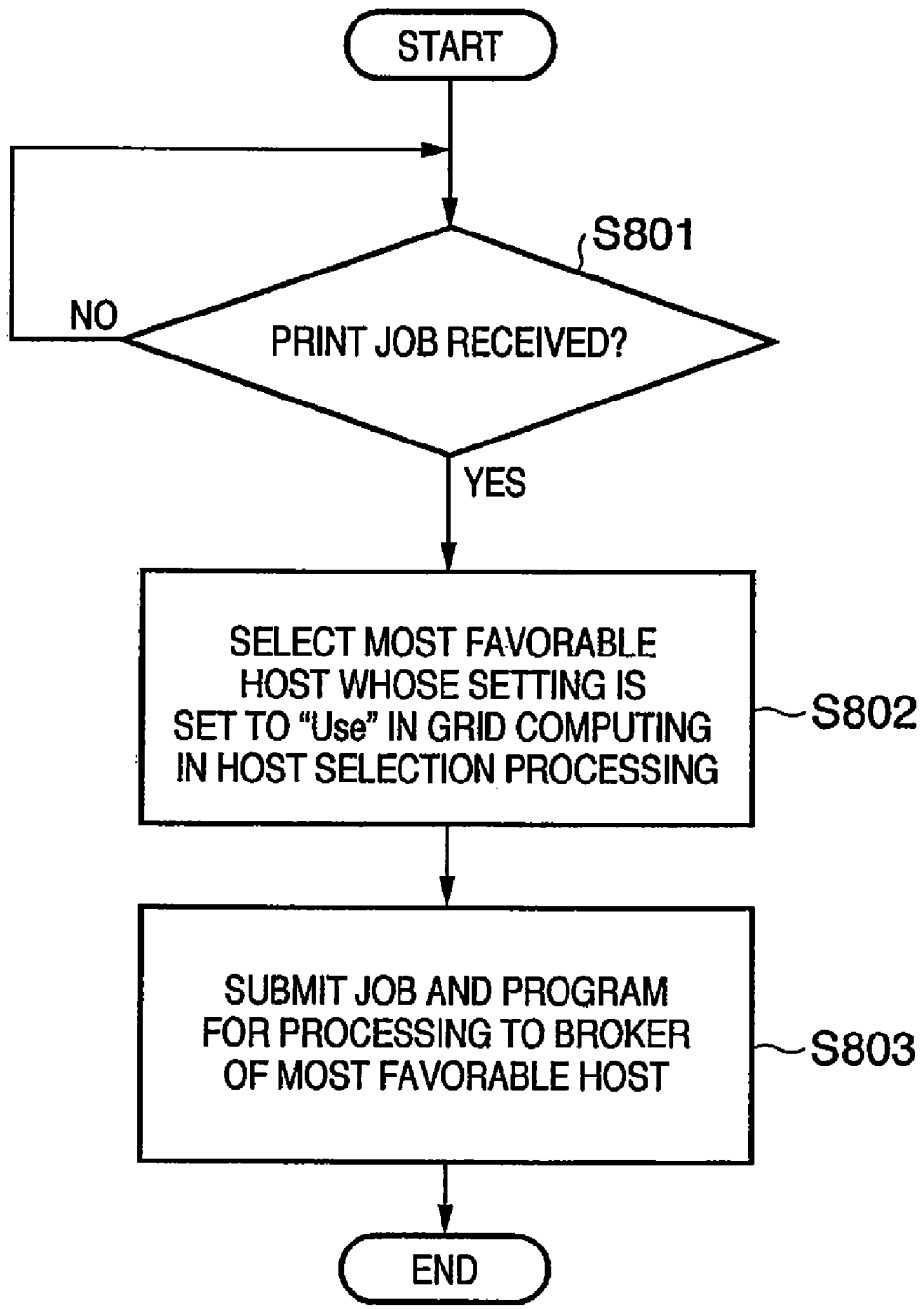
FIG. 8 is a flowchart showing load distribution processing for a print job of the first embodiment.

FIGS. 5 and 8 are flowcharts showing processing performed when setting up the image forming apparatus of this embodiment as a grid computing-based device. FIGS. 6 and 7 are views, respectively, for explaining user interfaces in the operating section 202 at the time of the setup.

The processing in the image forming apparatus shown in FIG. 5 is performed under the control of the CPU 301 in accordance with the system program stored in the HDD 304 in FIG. 4.

Setup processing in the image forming apparatus will be first explained with reference to the flowchart in FIG. 5 and FIG. 6.

FIG. 6 shows an example 601 of a screen to be displayed when a "Distribution Processing-Based Device Setup" button is pressed in a menu screen of the operation panel of the operating section 202 in the image forming apparatus and the concept of a group of host PCs. In the screen 601, an IP address is displayed for each of the PCs connected to the same network as the image forming apparatus and serving as the hosts. A user can input a host name as a management name from the operation panel for each PC. Also, a user can designate and select whether to set up each host PC as a grid computing-based device ("Set Up" or " - - - " is displayed in the field of Grid) from the operation panel.

The details of the processing flow will be explained using FIG. 5. The processing in FIG. 5 is performed when the "Distribution Processing-Based Device Setup" button is pressed as described above.

In step S501, the image forming apparatus collects pieces of information (IP addresses) of accessible host PCs connected to the same network as the image forming apparatus and displays them on the screen denoted by reference numeral 601 in FIG. 6 (step S502). The image forming apparatus receives a keystroke from the operation panel while displaying the screen 601 (step S503). The image forming apparatus holds information input from the operation panel in its memory (the RAM 302 in FIG. 4).

In the next step, step S504, the image forming apparatus determines whether an "Perform" key in the screen 601 has been pressed. If the key has been pressed, the image forming apparatus writes the data held in the RAM 302 in the nonvolatile memory (the NVRAM 316 in FIG. 4) (step S505). Finally, in step S506, the image forming apparatus sends, to each of host PCs designated as grid computing-based devices in the screen 601, a program for making the host PC capable of load distribution processing in grid computing (e.g., a program including a screen saver). This program is one performed when the remainder of the CPU resource of each PC is enough for the execution and implements, on the host PC, an RM (resource manager) function and a broker function constituting a grid mechanism.

Setting processing of application of distribution processing to each host PC which is related to setup of the image forming apparatus in a manner suited to a grid computing environment will be explained with reference to FIGS. 7 and 8.

FIG. 7 is a view showing an example 701 of a "Setting for Application of Distribution Processing" screen to be displayed on the operation panel 202 of the image forming apparatus. Host names set in the screen 601 in FIG. 6 are displayed. A setting as to whether to use each host PC in grid computing is displayed as "Use" or "Not Use" in the field of Grid. The setting can be changed by an input from the operation panel 202, and setting information is stored in the NVRAM 316 in FIG. 4.

How load distribution is performed upon receipt of a print job (in this example, e.g., a PDL job) after setup of or setting for each host as described above will be explained with reference to the flowchart in FIG. 8.

First, in step S801, the image forming apparatus determines whether a print job has been received. If any print job is received, a TM (task manager) of the image forming apparatus instructs a DJS to select the brokers of the most favorable ones of hosts in the next step, step S802. In the host selection processing, the TM causes the DJS to select a host whose setting in FIG. 7 is set to "Use" in grid computing and which has an idle resource that is the most favorable.

In step S803, the image forming apparatus sends job data and a program for processing corresponding to the type of the print job (e.g., a PDL conversion program if the data is written in a PDL) to the selected hosts. The host selection processing and job submission processing terminate. Note that the job data is divided into pieces of data of, e.g., a predetermined size (one page, a predetermined number of lines, or the like) and sent to the selected hosts. The subsequent processing to printing is the same as that for the framework of general grid computing, and an explanation thereof will be omitted.

As described above, in this embodiment, setup for applying grid computing to each host PC connected over the network can be easily performed from the operation panel of the image forming apparatus. It is also possible to exclude a host PC temporarily set up as a grid computing-based device as needed.

Figure 9:
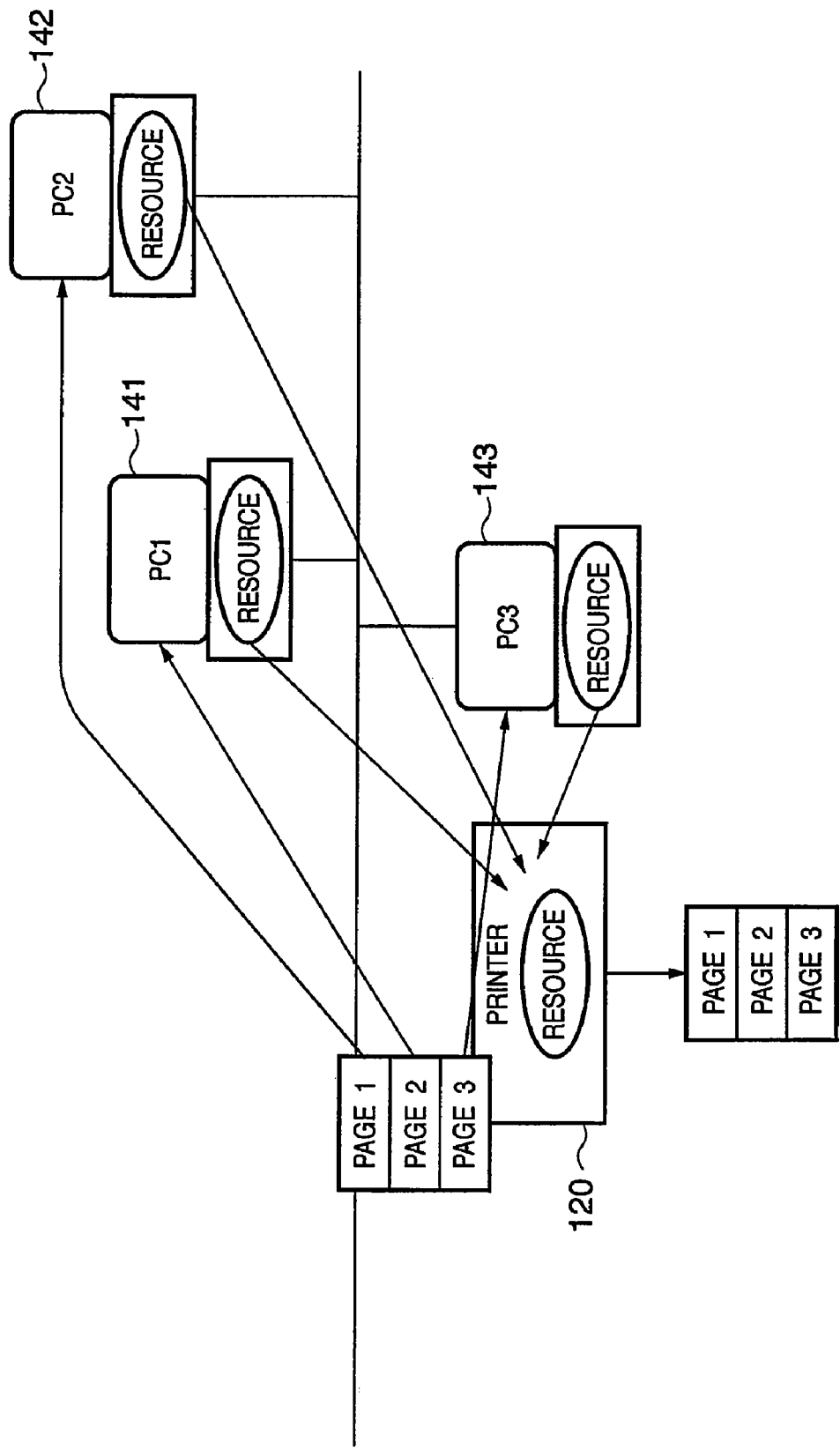
FIG. 9 is a flowchart of a case of processing a document scanned by the image forming apparatus of the first embodiment.

A case will be explained next with reference to FIG. 9 where a document scanned by the image forming apparatus of this embodiment is processed using grid computing. In this case, an image forming apparatus 120 has a TM function and a DJS function, similarly to the application to PDL processing explained with reference to FIG. 2. In the case, each of PCs PC1 141, PC2 142, and PC3 143 has a broker function and an RM function, and distribution processing by grid computing using the three PCs is applied.

When, e.g., a job which performs image processing for a scanned image is submitted from the image forming apparatus 120, the job is appropriately distributed among the resources of the PCs 141 to 143 via the TM and DJS of the image forming apparatus 120. Simultaneously with this, an application program for image processing is sent from the image forming apparatus 120 to each PC.

Image data formed by executing image processing in the PCs in a distributed manner are collected and finally output in a combined state by the image forming apparatus 120.

Note that the number of resources to which the distribution processing is to be allocated is not particularly limited, and three or more PCs may be used. The distribution processing may be allocated not only to the resource of a PC but also to the resource of an image forming apparatus on the same network as the PC.

Examples of image processing under consideration include character enhancement processing, edge processing, color adjustment processing, color conversion processing, scaling processing, and OCR (Optical Character Recognition) processing. However, other types of image processing will also suffice.

Figure 10:
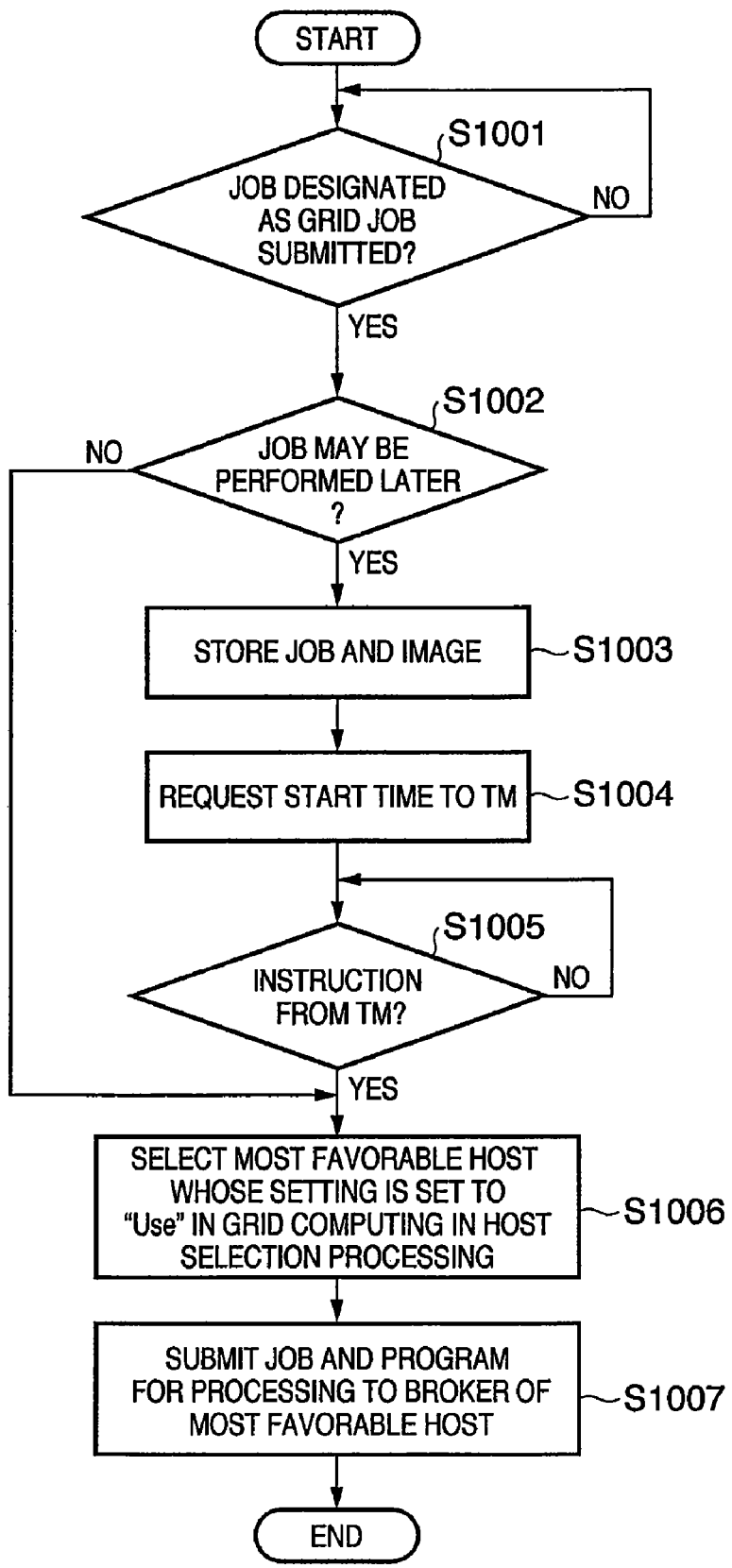
FIG. 10 is a flowchart of processing from submission of a job to distribution of the job among hosts in FIG. 9 to be performed by the image forming apparatus.

FIG. 10 is a flowchart when the image forming apparatus performs processing explained with reference to FIG. 9 from submission of a job to distribution processing among other image forming apparatuses such as a PC, an MFP, and the like.

In step S1001, the image forming apparatus determines whether a submitted scan job is designated to be subjected to grid processing. Whether to perform grid processing for the submitted job can be designated by designating for each type of image processing whether to use grid computing in a menu screen in user mode through the operating section 202. For example, assume here that color adjustment processing is designated to use grid computing. It is also possible to designate in the user mode whether a job designated to use grid computing is immediately performed or performed later (as background processing or the like) when an appropriate execution environment is created.

If the image forming apparatus determines in step S1001 that a job including color adjustment processing designated as a grid job is submitted, it determines in step S1002 whether the grid job is set to "possibly be performed later." If the job is set to "possibly be performed later," the image forming apparatus stores a scanned image and settings necessary for the job in the HDD 304 and terminates the scan job in step S1003. In the next step, step S1004, the image forming apparatus requests the TM to designate and tell the timing (start time) of starting grid processing.

The TM acquires the status information of each PC for which setting is made for application of distribution processing from the corresponding broker and determines whether grid processing can be started. For example, if an assumed level of performance is unlikely to be achieved by the PC, the TM determines that grid processing is not to be performed. The TM continues to acquire the status information of the set-up PC from the broker at regular intervals until conditions for execution of grid computing are met. Pieces of information contained in the status information, of which the TM is notified by the broker, such as the CPU type of the host, the CPU occupation rate in the host, whether the host has been successfully started up and is running, and the like are used as information for determining the performance.

If the image forming apparatus determines in step S1005 that the TM has issued an instruction to start the job, the flow advances to step S1006. In step S1006, the TM inquires the DJS and selects the most favorable ones of brokers. At the time of the selection, the TM selects a host with the most favorable resource from hosts selected for application of grid computing (whose settings are set to "Use") in the setting explained with reference to FIG. 7.

In step S1007, the image forming apparatus sends, to the selected hosts, a program for processing corresponding to the type of image processing (in this example, a program for color adjustment processing) and image data stored in the HDD 304 and appropriately divided and terminates the host selection processing and job submission processing. The subsequent process of collecting the image processing results is the same as that for the framework of general grid computing, and an explanation thereof will be omitted.

On the other hand, if the image forming apparatus determines in step S1002 that the grid job is not set to "possibly be performed later," the flow advances to step S1006 to perform the same processing as described above.

Note that in this example, the TM acquires status information from each broker and determines the timing of starting execution of the job using grid computing. However, for example, if a user designates the time for execution of the grid job through the operating section 202, and the grid job is set to "possibly be performed later," the grid job may be performed at the designated time. Since the resources of a PC and an image forming apparatus can be fully utilized at, e.g., midnight, this configuration makes it possible to efficiently perform distribution processing by setting the time for execution of grid processing to a late-night time slot.

As described above, in this embodiment, execution of grid processing can be designated from the operation panel of the image forming apparatus. It is also possible for a user to determine to designate, through the operating section, a job which requires no immediate results or a job which may take a long time to be processed not to be immediately subjected to grid processing but to be subjected to the processing when the remainder of the resource for grid computing is enough. With this configuration, a user can flexibly and easily designate the timing for submission of a job using CPU resources for grid computing related to the image forming apparatus and the timing for execution of the job, using the user interface of the image forming apparatus.

(Filing Function)

Figure 11:
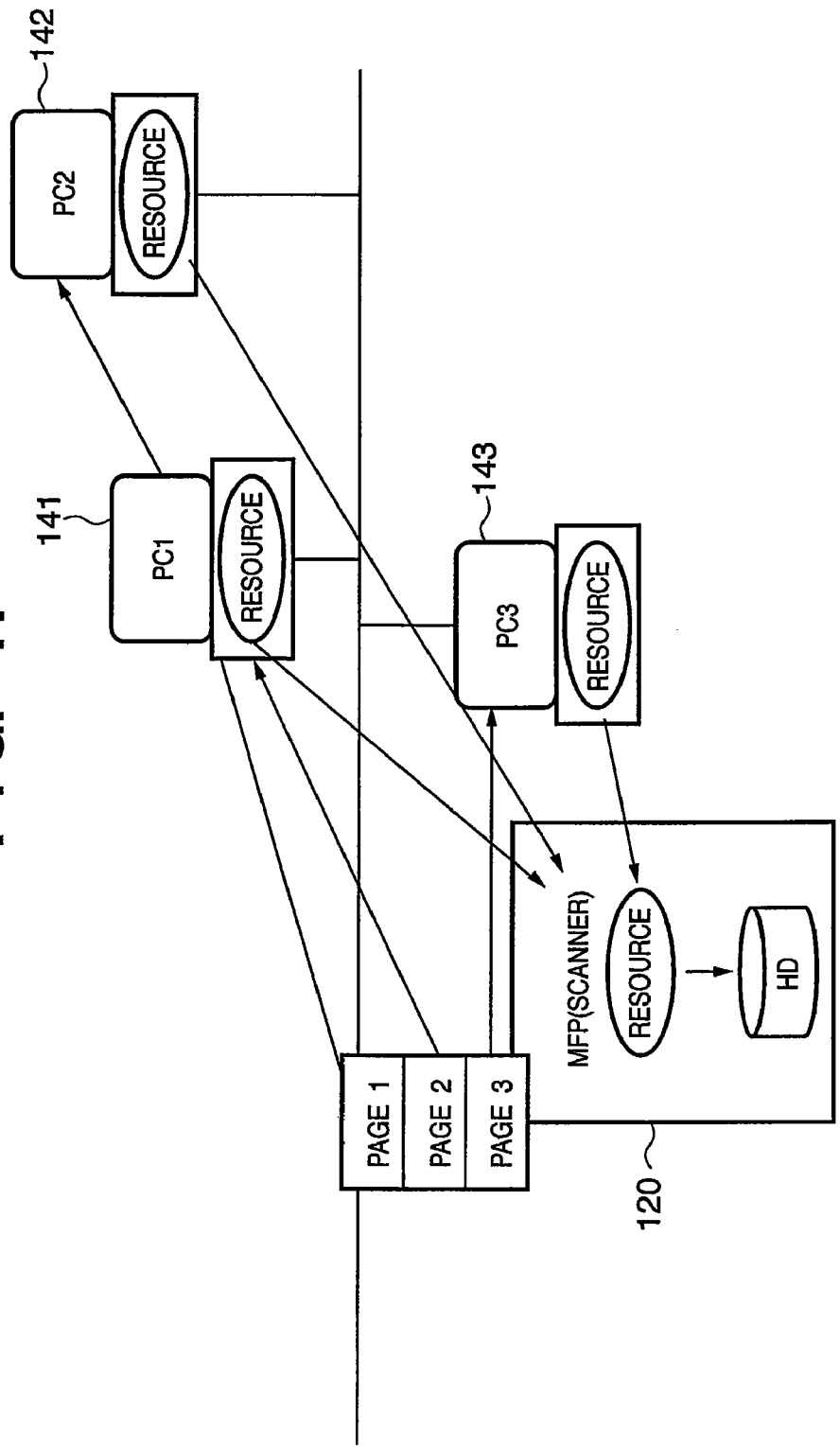
FIG. 11 is a diagram showing processing of a case Of OCRing and filing a document scanned by the image forming apparatus of the first embodiment.

Processing of a case of OCRing and filing a document scanned by the image forming apparatus in this embodiment using the mechanism of grid computing will be explained with reference to FIG. 11. In this case, the image forming apparatus 120 is equipped with a TM function and a DJS function, similarly to the application to PDL processing explained with reference to FIG. 2. In the case, each of the PCs PC1 141, PC2 142, and PC3 143 is equipped with a broker function and an RM function, and distribution processing by grid computing using the three PCs is applied.

When, e.g., a job which performs OCR processing for a scanned image is submitted from the image forming apparatus 120, the job is appropriately distributed among the resources of the PCs 141 to 143 via the TM and DJS of the image forming apparatus 120. Simultaneously with this, an application program for OCR processing is sent from the image forming apparatus 120 to the PCs.

The pieces of image data formed by executing OCR processing in the PCs in a distributed manner are collected and finally stored in the HDD in a combined state by the image forming apparatus 120.

Note that the number of resources to which distribution processing is allocated is not particularly limited, and three or more PCs may be used. The distribution processing may be allocated not only to the resource of a PC but also to the resource of an image forming apparatus on the same network as the PC.

Examples of processing to which grid computing is applied under consideration include OCR processing. However, grid computing may be applied to other types of image processing.

Figure 12:
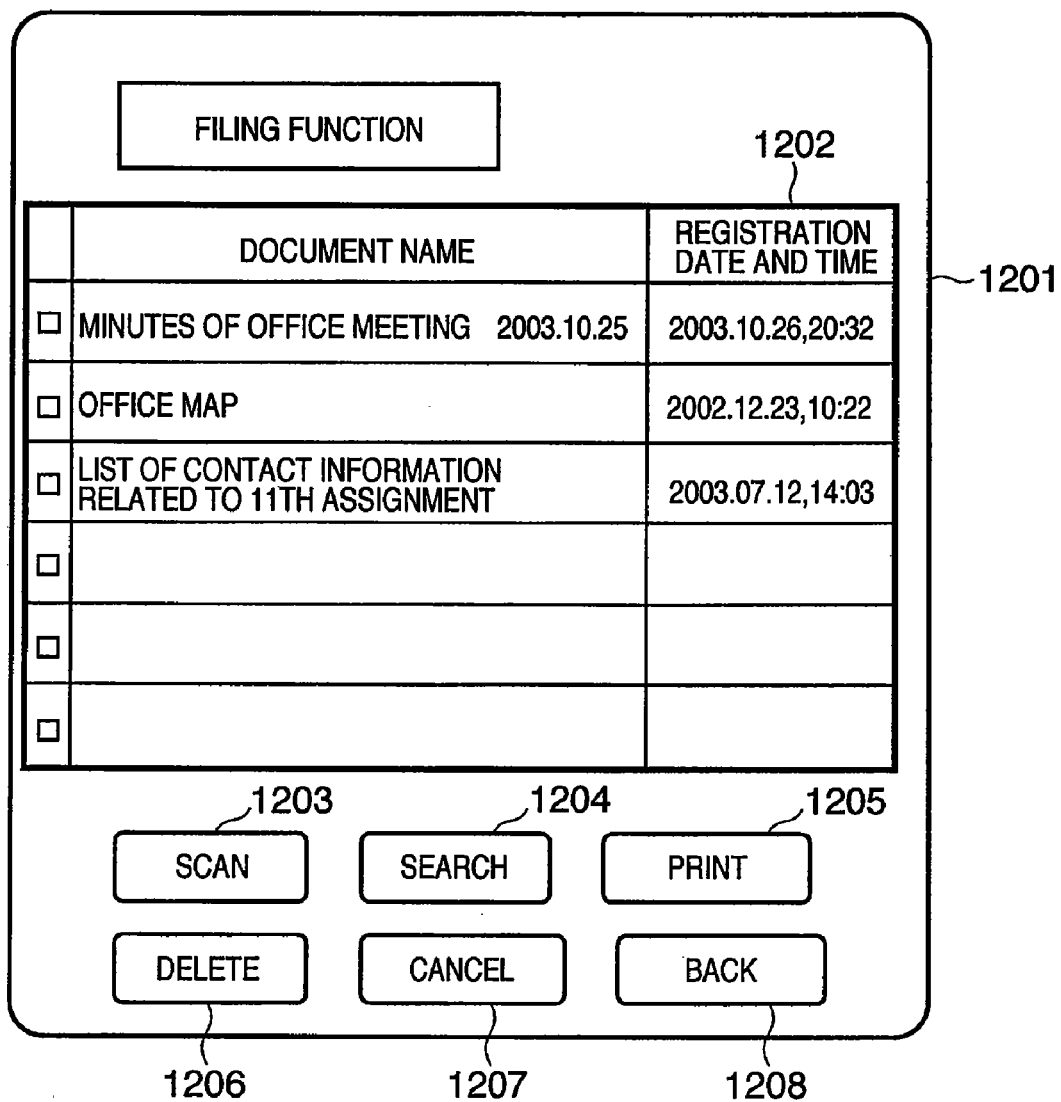
FIG. 12 is a view showing an example of a filing function screen of the image forming apparatus of the first embodiment.

FIG. 12 is a view showing an example of a "Filing Function" screen to be displayed on the operation panel of the image forming apparatus of this embodiment. In a screen 1201, the document names and registration dates and times of documents registered in the hard disk in the MFP are listed within a window 1202. A check box with which a user selects a document is arranged at the left end of the document. If the list does not fit in the window, a scroll bar is displayed. By clicking a cell in the column of document names, a document name in the cell can be changed or a new document name can be input into the cell.

When a scan button 1203 is pressed while document paper sheets are set in the document feeder 204, the document paper sheets are fed by the document feeder 204 and scanned, and image data is stored in the HDD 304 in the MFP. At this time, each page is subjected to OCR processing using the function of grid computing. Obtained text data for each page is stored in the HDD 304 such that it corresponds to the image data of the page.

When a search button 1204 is pressed, a character string input dialog with a software keyboard appears. A document containing a character string can be searched for by inputting the character string in the dialog. Text data obtained by the OCR processing is used for this search.

When a print button 1205 is pressed while one or more documents are selected (corresponding check boxes are marked), the selected documents are printed by the MFP.

When a delete button 1206 is pressed while one or more documents are selected, the image data of the selected documents and text data related to the image data are erased from the HDD 304 of the MFP.

A cancel button 1207 is used to cancel scanning or printing. When a back button 1208 is pressed, the operation screen closes, and the focus returns to the menu screen.

(Processing at Power Shutdown)

Processing at power shutdown in an image forming apparatus (MFP) which is characteristic of this embodiment will be explained below with reference to the flowchart in FIG. 13.

Note that the following processing is implemented by handling the program stored in the ROM 303 under the control of the CPU 301 of the image forming apparatus.

In step S1301, upon receipt of a power-off instruction from a user with a soft power switch, the MFP starts the following processing. In step S1302, the MFP determines whether it is currently executing distribution processing requested by another image forming apparatus such as a PC or MFP in the background or in another manner. If the MFP is not executing distribution processing, the flow advances to step S1310 to perform power-off processing.

Figure 14:
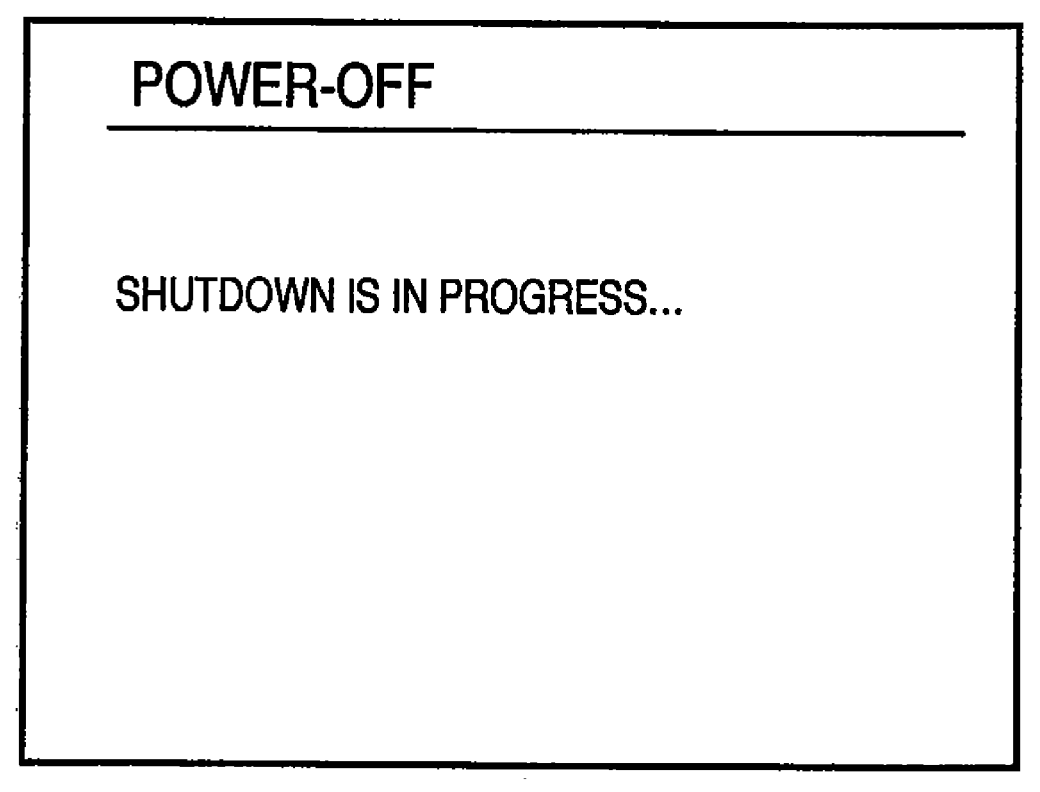

FIG. 14 shows an example of a screen to be displayed on the operation panel of the image forming apparatus (MFP) during the power-off processing. This screen notifies a user that shutdown processing is being performed.

Figure 15:
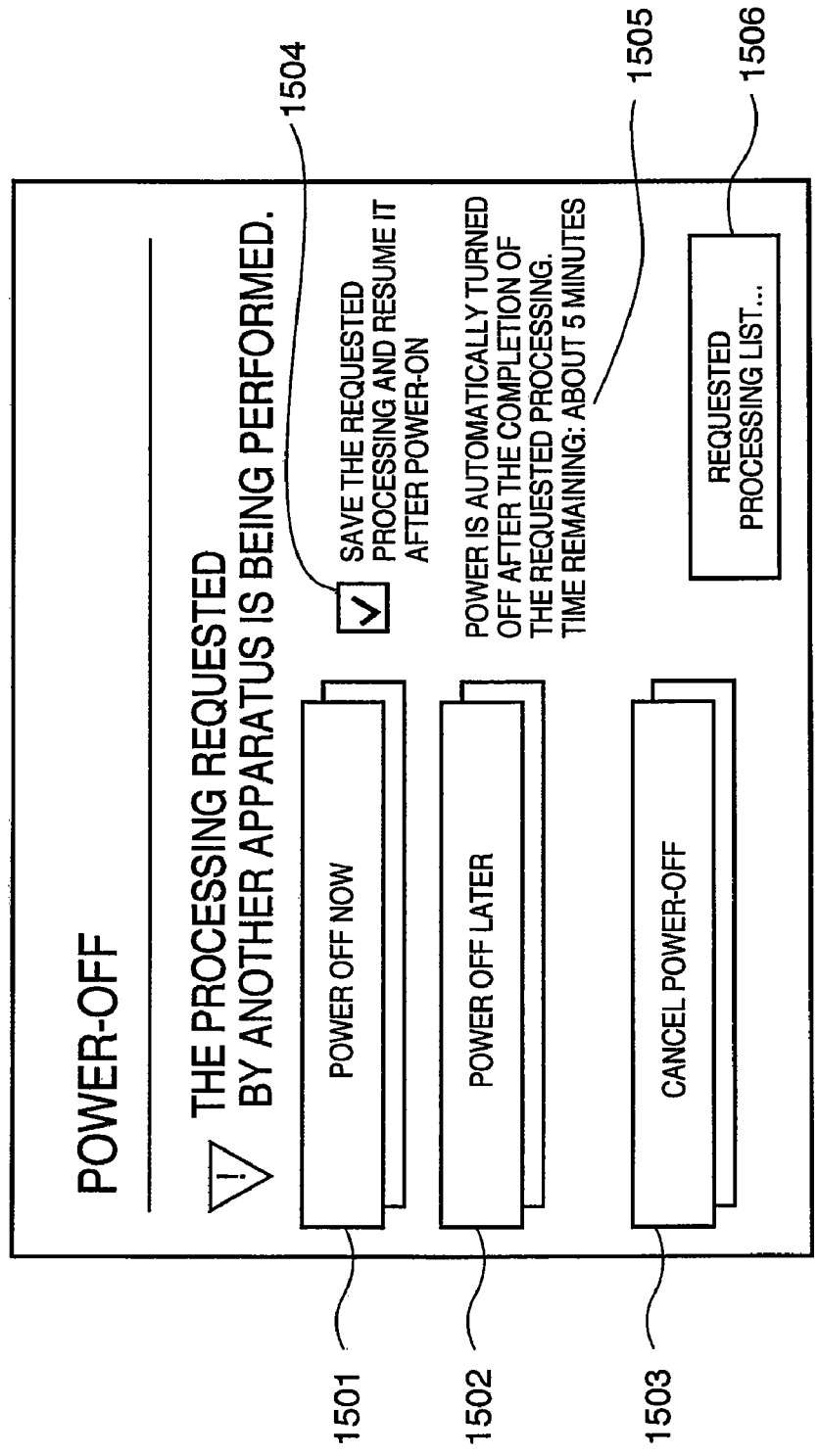
FIG. 15 is a view showing an example of a selection screen related to the processing at power shutdown of the first embodiment.

On the other hand, if the MFP determines in step S1302 that it is executing distribution processing in the background or in another manner, the flow advances to step S1303 to display a processing selection screen. FIG. 15 is a view showing an example of the processing selection screen. The processing selection screen notifies a user that the MFP is executing processing requested by another device. At the same time, the processing selection screen prompts the user to select what to do about the requested processing, the timing for execution of power-off, and the like.

In step S1304, the MFP waits for an input from a user. In step S1305, the MFP detects whether the input is a cancel instruction, i.e., whether the button 1503 has been pressed in the processing selection screen in FIG. 15. If the button 1503 has been pressed, the flow advances to step S1311 to perform cancel processing. In this processing, the screen in FIG. 15 closes, and the focus returns to the screen previously displayed.

Figure 13:
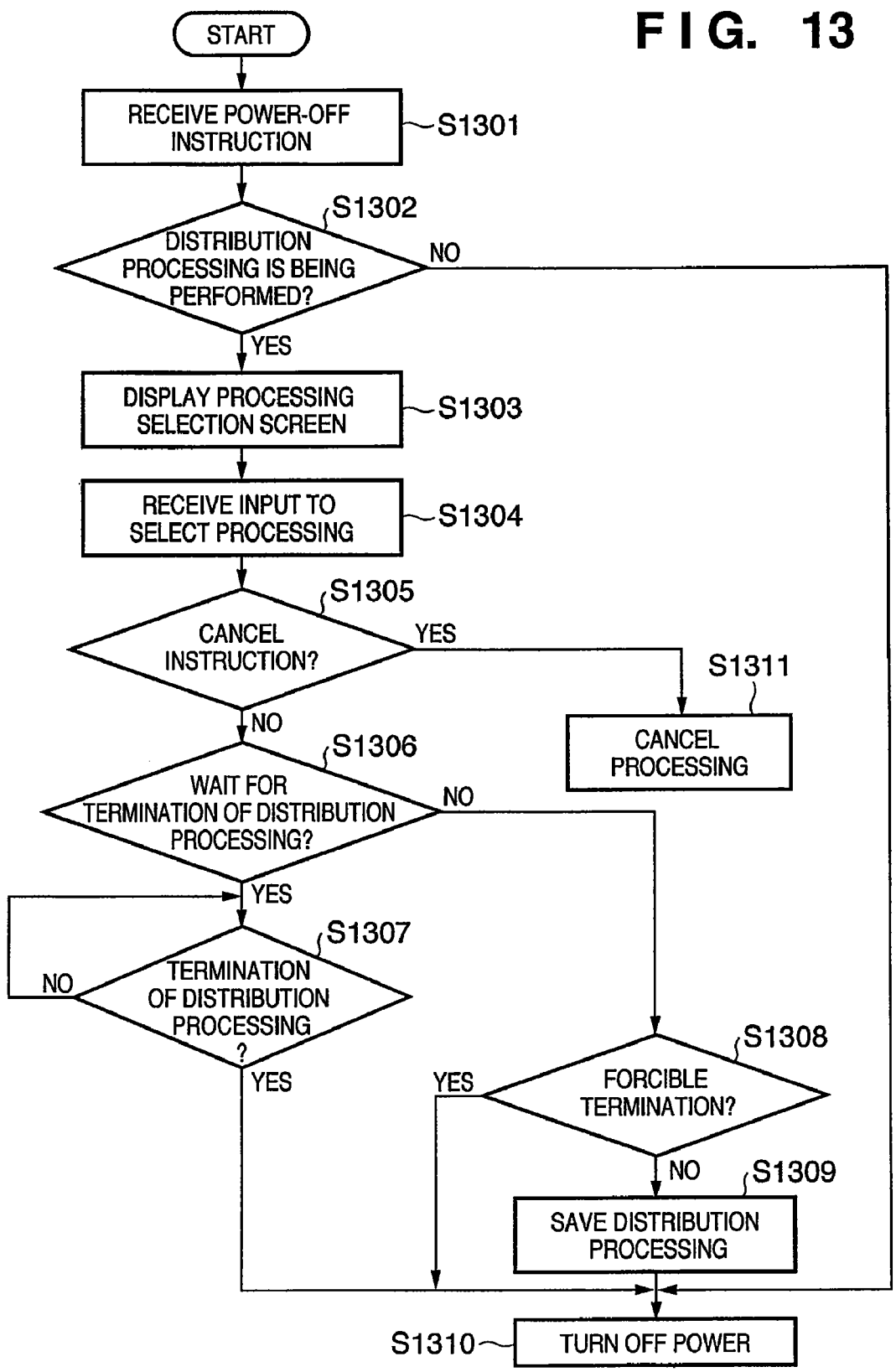
FIG. 13 is a flowchart of processing at power shutdown of the first embodiment.

In the flowchart in FIG. 13, if the MFP determines in step S1308 that forcible termination is selected, the flow immediately advances to step S1310 to perform power-off processing. However, before execution of power-off processing, the DJS for grid computing may be notified of interruption of the requested processing and, as needed, request another MFP to perform the processing by proxy. After that, the flow advances to step S1310 to perform power-off processing.

If the MFP determines in step S1306 not to wait until the distribution processing terminates, the flow advances to step S1308. In step S1308, the MFP determines whether forcible termination is selected, i.e., whether a "Power Off Now" button 1501 has been pressed while a check button 1504 in FIG. 15 is not checked. If the button 1501 has been pressed, no particular processing is performed, and the flow advances to step S1310 to immediately perform power-off processing.

If the MFP determines in step S1308 that forcible termination is not selected (the check button 1504 in FIG. 15 is checked), the flow advances to step S1309. The MFP saves the information of the distribution processing currently being performed in the HDD 304. After that, the flow advances to step S1310 to perform power-off processing. In this case, if the MFP is started up the next time, it resumes the distribution processing on the basis of the saved information.

In the flowchart in FIG. 13, if the MFP determines in step S1308 that forcible termination is selected, the flow immediately advances to step S1310 to perform power-off processing. However, before execution of power-off processing, the DJS for grid computing may be notified of interruption of the requested processing and, as needed, request another MFP to perform the processing by proxy.

Figure 16:
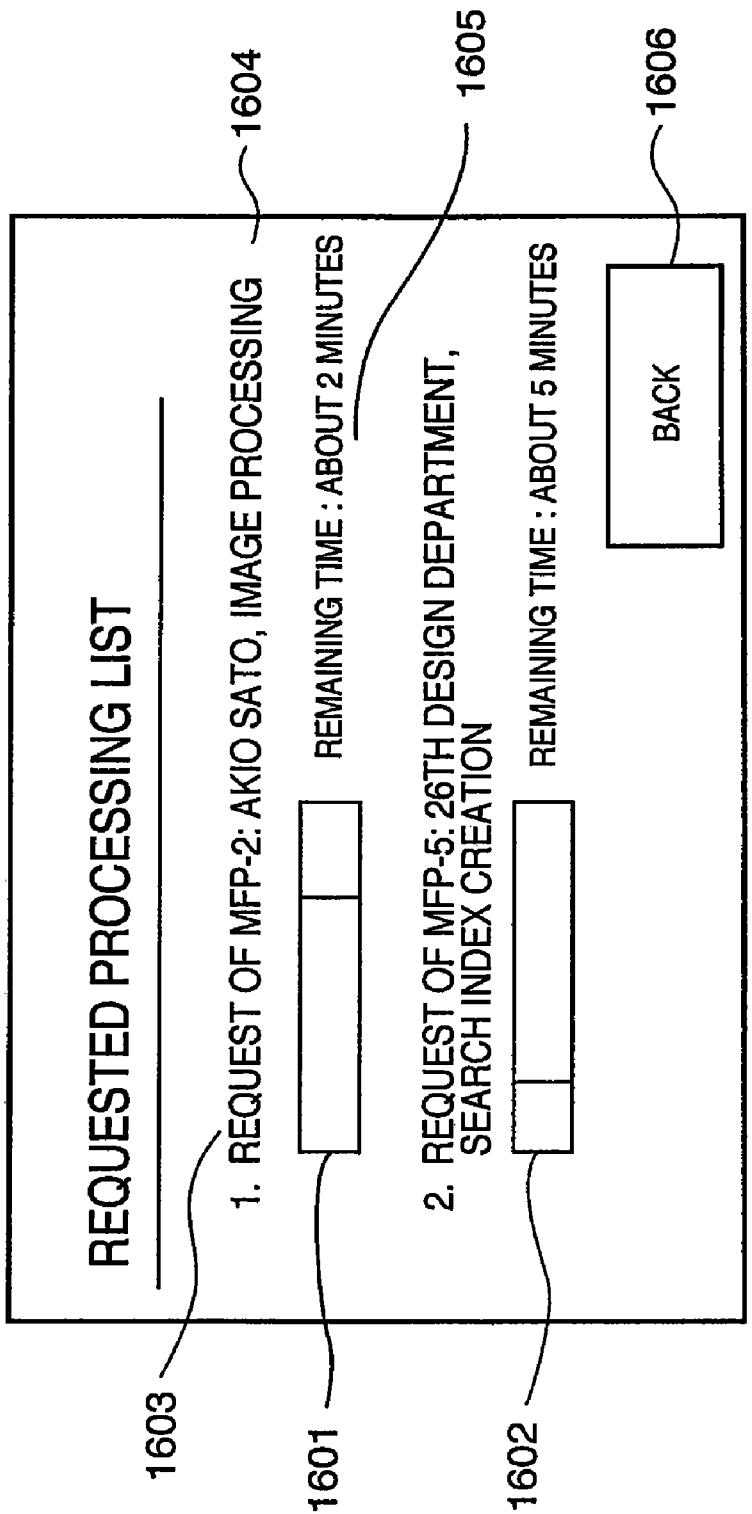
FIG. 16 is a view showing a requested processing list screen to be displayed subsequent to the screen in FIG. 15.

The processing selection screen in FIG. 15 has a requested processing list screen 1506. When the button is pressed, a requested processing list screen illustrated in FIG. 16 is displayed. The example shown in FIG. 16 indicates that two types of processing, processing 1601 and processing 1602 are currently performed in the background. By which MFP the requested processing denoted by reference numeral 1601 is requested is displayed in a portion denoted by reference numeral 1603, and the description of the requested processing is displayed in a portion denoted by reference numeral 1604. An estimated time to (the remaining time before) the termination of the processing 1601 is displayed in a portion denoted by reference numeral 1605. Information about the other requested processing 1602 is displayed in the same manner. When a "Back" button 1606 is pressed in the requested processing list screen, the focus returns to the processing selection screen in FIG. 15.

An estimated time to the termination of all background processing is displayed in a region 1505 of the processing selection screen in FIG. 15. The longest one of the estimated times of the types of requested processing displayed in FIG. 16 is displayed as this estimated time.

As has been explained above, according to this embodiment, when processing requested by another device is being performed at power shutdown in a configuration in which grid computing is applied to an image forming apparatus such as an MFP, the image forming apparatus can implement selective power shutdown. More specifically, the image forming apparatus can notify a user that it has processing being performed. At the same time, the image forming apparatus can shut down power after performing for the distribution processing being performed any of 1) waiting for the termination of the processing, 2) saving the processing, and 3) interrupting the processing in accordance with a user selection. For this reason, it is possible to make more efficient a distribution processing system including a device whose power is relatively frequently shut down.

Other Embodiment

The above-described embodiment has been explained using as an example a configuration in which an image forming apparatus is equipped with a control program for grid computing. Components with which grid computing is implemented may be independent of each other, and a server, another PC, and the like may be equipped with this program.

The embodiment is an example which uses grid computing technology. However, the present invention can similarly be applied to an apparatus configured to be capable of executing processing requested by another device connected over a network. Examples of the processing include execution of processing requested by another device in the background such as running of service software or downloading of firmware from a PC connected to an MFP through a LAN.

The present invention may be applied to a grid computing system (grid network) composed of a plurality of devices. The present invention may also be applied to a single device constituting a grid network.

Note that the present invention includes a case where the present invention is achieved by directly or remotely supplying a program of software (a program corresponding to the flowcharts shown in FIGS. 5, 8, 10, 13, and 19 in this embodiment) which implements the functions of the above-described embodiment to a system or apparatus and reading out and executing the supplied program code by a computer of the system or apparatus. In this case, software need not have the form of program as long as it has the program function.

Therefore, the program code itself installed in a computer to implement the functional processing of the present invention using the computer implements the present invention.

That is, the scope of the claims of the present invention includes the computer program itself for implementing the functional processing of the present invention.

In this case, the form of program is not particularly limited, and an object code, a program to be performed by an interpreter, script data to be supplied to an OS, and the like may be used as long as they have the program function.

As a recording medium for supplying the program, for example, a flexible disk, hard disk, optical disk, magnetooptical disk, MO, CD-ROM, CD-R, CD-RW, magnetic tape, nonvolatile memory card, ROM, DVD (DVD-ROM, DVD-R), and the like may be used.

As another program supply method, the program may be supplied by accessing a home page on the Internet using a browser on a client computer and downloading the computer program itself of the present invention or a compressed file containing an automatic installation function from the home page onto a recording medium such as a hard disk. The present invention may also be implemented by downloading, from different home pages, a plurality of files into which the program code forming the program of the present invention is segmented. That is, a WWW server which causes a plurality of users to download a program file required to implement the functional processing of the present invention by the computer also falls within the scope of the present invention.

Additionally, the present invention may be implemented by delivering, to users, a storage medium such as a CD-ROM storing the program of the present invention having been encrypted, allowing a user who meets a predetermined condition to download key information for decrypting the program from a home page over the Internet, and executing the encrypted program using the key information to be installed on a computer.

The functions of the above-described embodiment may be implemented not only by executing the read-out program code by the computer but also by some or all of actual processing performed by an OS or the like running on the computer in accordance with an instruction of the program.

Moreover, the functions of the above-described embodiment may be implemented by some or all of actual processing performed, in accordance with an instruction of the program read out from the recording medium, by a CPU or the like of a function extension board or function extension unit which is inserted in or connected to the computer, after the program is written in a memory of the function extension board or function extension unit.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-106790, filed Apr. 1, 2005, which is hereby incorporated by reference herein in its entirety.

What is claimed is:

1. An image processing apparatus which is connected to a network, accepts a request for processing from a client, and distributes its processing workload to other apparatuses on the network, comprising:

a notifying unit, adapted to, if the image processing apparatus is instructed to shut down power when the other apparatuses are performing the requested processing on behalf of the image processing apparatus, provide notification to the client that the requested processing is being performed;

an input unit adapted for the client to, in response to the notification, select one of a predetermined plurality of processing options or no processing before shutting down power; and a termination processing unit adapted to shut down power after implementing the processing option, or no processing, selected by the client.

2. The image processing apparatus according to claim 1, wherein the requested processing includes a plurality of types of processing.

3. The image processing apparatus according to claim 1, wherein the request for processing is accepted from another apparatus over the network, using grid computing technology.

4. The image processing apparatus according to claim 1, further comprising a remaining time calculation unit adapted to calculate an estimated time to termination of the requested processing, wherein said notifying unit displays the estimated time on a screen.

5. The image processing apparatus according to claim 4, wherein if the requested processing includes a plurality of types of processing, an estimated time is displayed on the screen for each of the plurality of types of processing.

6. The image processing apparatus according to claim 1, wherein display is made such that a client can select whether to interrupt and save the requested processing.

7. The image processing apparatus according to claim 1, wherein said termination processing unit provides notification to still another apparatus over the network that the requested processing is to be interrupted.

8. The image processing apparatus according to claim 1, wherein said termination processing unit transfers the request for processing to still another apparatus over the network using a dynamic scheduler.

9. The image processing apparatus according to claim 7, wherein the still another apparatus is an apparatus to which the processing workload is distributed.

10. The image processing apparatus according to claim 1, wherein the image processing apparatus is a piece of multifunction peripheral equipment which comprises a scanner function of reading a document and a printer function of printing image data.

11. A control method for an image processing apparatus which is connected to a network, accepts a request for processing from a client, and distributes its processing workload to other apparatuses in the network, comprising:

a determination step of, if the image processing apparatus is instructed to shut down power, determining whether the requested processing is being performed by the other apparatuses;

a notifying step of, if it is determined that the requested processing is being performed by the other apparatuses, providing notification accordingly to the client;

an instruction receiving step of receiving an instruction input by the client in response to the notification, the instruction selecting one of a predetermined plurality of processing options or no processing before shutting down power; and a termination processing step of shutting down power after implementing the processing option, or no processing, selected by the user.

12. An image processing apparatus which is connected to a network, accepts a request for processing from a client, and distributes its processing workload to other apparatuses in the network, comprising:

notifying means adapted to, if the apparatus is instructed to shut down power when the other apparatuses are performing the requested processing on behalf of the image processing apparatus, provide notification to the client that the requested distribution processing is being performed;

input means adapted for the client to input an instruction in response to the notification; and termination processing means adapted to shut down power after performing processing corresponding to the instruction, wherein said input means is means for making the user select from among a plurality of processing options in conjunction with an instruction for shutting down power, and wherein said plurality of processing options includes:

a first option, of shutting down power after the requested processing is performed, a second option, of notifying a management apparatus connected to the network of interruption of the requested processing, and then shutting down power, where the management apparatus requests another apparatus (other than the image processing apparatus) to handle the request for processing, and a third option, of shutting down power after storing a state of the requested processing in a storage device in order for the image processing apparatus to resume the requested processing when the image processing apparatus is started up next time.

13. A control method for an image processing apparatus which is connected to a network, accepts a request for processing from a client, and distributes its processing workload to other apparatuses in the network, comprising:

a determination step of, if the apparatus is instructed to shut down power, determining whether the requested processing is being performed by the other apparatuses;

a notifying step of, if it is determined that the requested processing is being performed by the other apparatuses, providing notification accordingly to the client;

an instruction receiving step of receiving an instruction input by the client in response to the instruction; and a termination processing step of shutting down power after performing processing corresponding to the instruction, wherein said instruction receiving step is a step of making the client select from among a plurality of processing options in conjunction with an instruction for shutting down power, and wherein said plurality of processing options includes:

a first option, of shutting down power after the requested processing is performed, a second option, of notifying a management apparatus connected to the network of interruption of the requested processing, and then shutting down power, where the management apparatus requests another apparatus (other than the image processing apparatus) to handle the request for processing, and a third option, of shutting down power after storing a state of the requested processing in a storage device in order for the image processing apparatus to resume the requested processing when the image processing apparatus is started up next time.

* * * * *